March 7, 1967 CHIU HSIAN TING 3,308,444

THERMOPLASTIC RECORDING SYSTEM

Filed April 27, 1964

INVENTOR.
CHIU H. TING

BY Elmer Galbraith

ATTORNEY

United States Patent Office 3,308,444

Patented Mar. 7, 1967

3,308,444

THERMOPLASTIC RECORDING SYSTEM

Chiu Hsian Ting, Stanford, Calif., assignor to International Business Machines Corporation, New York, N.Y., a corporation of New York Filed Apr. 27, 1964, Ser. No. 362,614
10 Claims. (Cl. 340—173)

The present invention relates to information storage and more particularly to the storage of information in the form of a deformation pattern.

It is well known that information can be stored in a form of a deformation pattern. Co-pending application, Serial No. 362,613 filed April 27, 1964, entitled, "Electron Beam Readout of Thermoplastic Recording," which is assigned to the assignee of the present invention describes a system for recording information in the form of a deformation pattern wherein the information can be read using a modulated electron beam. The structure shown in the above referred to co-pending application includes a layer of thermoplastic material which has a thin conductive coating thereon. The conductive coating deforms with the thermoplastic material. During the reading operation, an electron beam is directed at the conductive coating and the number of backscattered electrons is detected to determine the presence of any deformations. The conductive coating prevents any accumulation of charges during the reading operation.

Information is written in the device described in the above referred application by depositing a charge pattern on a layer of insulating material which is positioned on the opposite side of said thermoplastic material from the conductive layer mentioned above. After the charge pattern has been deposited on the insulating layer, the thermoplastic material and the conductive layer are heated and the thermoplastic material deforms due to the electrostatic forces created by the charge pattern. Thus, with the device shown in the above referred co-pending application, either two separate electron guns are needed for the reading and writing operations or the recording surface must be reoriented relative to a single electron gun between the writing and reading operations.

The present invention provides a somewhat similar information storage device which has the advantage that only one electron gun is needed for both the reading and writing operations and the further advantage that the physical orientation between the recording member and the electron gun is the same during writing and reading operations.

An object of the present invention is to provide an improved information storage device.

A further object of the present invention is to provide an improved information storage device wherein information is stored in the form of a deformation pattern.

Still another object of the present invention is to provide an improved information storage device wherein information is stored in the form of a deformation pattern and wherein the information can be read using an electron beam.

A still further object of the present invention is to provide a system consistent with the above objects wherein there is only a single electron gun and wherein the orientation between the recording member and the electron gun need not be changed between the reading and writing oprations.

The system of the present invention includes a recording member which consists of a layer of thermoplastic material coated with a layer of material with a variable conductivity. During the writing operation, the material with a variable conductivity has a high resistivity; thus, it acts as a layer of insulating material, and during the reading operation the material with a variable conductivity has a low resistivity; thus, it acts as a conductive material.

The foregoing and other objects, features and advantages of the invention will be apparent from the following more particular description of preferred embodiments of the invention, as illustrated in the accompanying drawings.

Figure 1:
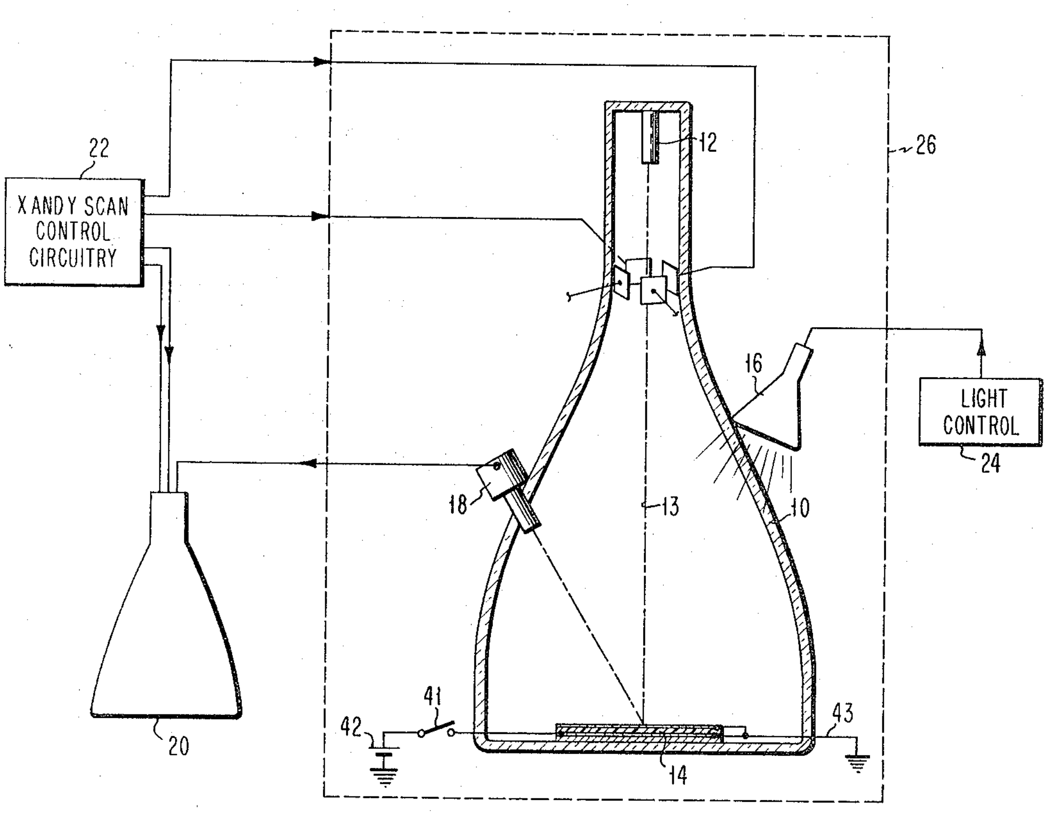
FIGURE 1 shows an overall view of a first preferred embodiment of the present invention.

The preferred embodiment of the present invention shown in FIGURE 1 includes an evacuated envelope 10, an electron gun 12 which generates an electron beam 13, a storage element 14, a light source 16, an electron detector 18, an output scope 20, scan control circuitry 22, light control circuitry 24 and the light eliminating box 26.

Figure 2:
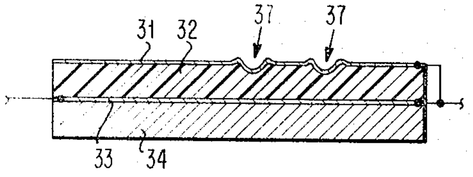
FIGURE 2 shows a cross sectional view of the recording member.

The storage element 14 is shown in more detail in FIGURE 2. It includes a layer of photoconductive material 31, a layer of thermoplastic material 32, a layer of conductive material 33 and a substrate 34.

Evacuated envelope 10 is transparent; thus, the light generated by light source 16 shines on photoconductive layer 31. When light source 16 is ON, photoconductive layer 31 is illuminated and it has a low conductivity. When light source 16 is OFF, photoconductive layer 31 is not illuminated and it has a high conductivity.

Information is stored on storage element 14 by electron beam 13. During the storage or writing operation, light source 16 is OFF; therefore, photoconductive layer 31 has a low conductivity. During the writing operation the electron beam 13 is used to create a pattern of electron charges on the surface of photoconductive layer 31. After the pattern of electron charges has been deposited on photoconductive layer 31, current is passed through conductive layer 33 thereby heating thermoplastic layer 32. The charges deposited on layer 31 induce image charges in conductive layer 33 and electrostatic forces are created between the charges in layers 31 and 33. These electrostatic forces deform the heated thermoplastic layer 32 and the photoconductive layer 31. After thermoplastic layer 32 and photoconductive layer 31 are deformed, they are allowed to cool thereby permanently recording in the form of a deformation pattern the information which was stored on photoconductive layer 31 by electron beam 13. Examples of the type of deformations which are formed are indicated by the numerals 37 in FIGURE 2.

Information is read by first illuminating photoconductive layer 31 by means of light source 16. The illumination from light source 16 increases the conductivity of layer 31. Thereafter, electron beam 13 is directed at layer 31. The number of electrons backscattered to detector 18 depends upon the particular orientation of the area of the storage element 14 wherein electron beam 13 is incident. Since photoconductive layer 31 in the illuminated state has low resistivity, there is no charge accumulation due to the electron beam 13 during the reading operation.

During the writing operation, the velocity of electron beam 13 should be such that the secondary emission ratio is less than unity and such that there is no electron beam bombardment induced conductivity in layer 31. In this way a charge can be accumulated on layer 31 as required. During the reading operation, the particular velocity of electron beam 13 is in principle irrelevant; however, for convenience the same beam as used during the writing operation is used. For example, an electron beam having an accelerating potential of ten thousand volts could be used for both reading and writing. Due to the fact that layer 31 is conductive there is accumulation of charge during the reading operation.

The output from detector 18 controls the intensity of the electron beam in the output scope 20. The deflection of the electron beam in scope 20 is controlled by circuitry 22 as is electron beam 13. Thus, the electron beam in output scope 20 moves in synchronization with the motion of electron beam 13. During the reading operation, electron beam 13 scans record 14 and the electron beam in the cathode ray scope 20 scans the face thereof similar to the manner that the face of a television tube is scanned.

The details of the scan control circuitry 22 and light control circuitry 24 are not shown in detail herein since such circuitry is well known in the art. Likewise, the details of detector 18 are not shown in detail herein since such detectors are known in the art. The details of a particular detector which could be used are shown in the above referenced co-pending application. Other detectors such as the solar cells manufactured by Hoffman Semiconductor Division or the diode detector SD–100 made by Edgerton, Germeshausen and Grier, Inc. of Boston could also be used.

Light elimination box 26 (shown schematically in the drawing) insures that no spurious light signals reduce the resistivity of layer 31 during the writing operation.

Layer 31 is connected to ground through connector 43 so that there is no accumulation of charge on layer 31 during the reading operation. The current needed to heat the thermoplastic layer is supplied by source 42 through switch 41. The length of time that switch 41 must be closed to generate enough heat can be determined by calculation or by a number of trials.

Layer 31 may consist of a photoconductor 500 angstroms thick. Layer 32 may consist of polystyrene, or the copolymers thereof. Layer 32 would be in the range of 25 microns thick. Layer 33 may consist of a layer of tin oxide which is about 500 angstroms thick. Substrate 34 could be any suitable insulation such as glass. It could be eliminated by making layer 33 of suitable thickness.

As shown in the first embodiment, the thermoplastic material 32 and the photoconductive material 31 are located in two separate layers. In the second embodiment shown in FIGURE 3, these two layers are combined into one layer which has suitable thermoplastic and photoconductive properties.

Figure 3:
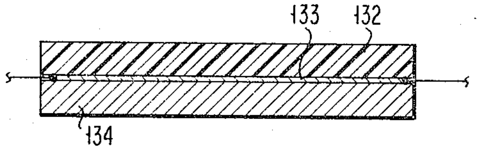
FIGURE 3 shows a cross sectional view of a second embodiment of the recording member.

The second preferred embodiment is identical to the first embodiment except that information storage area 14 is fabricated as shown in FIGURE 3 instead of as shown in FIGURES 1 and 2. In the second embodiment, the information storage area 14 includes a substrate 134, a layer of conductive material 133 and a layer of material 132 which is both thermoplastic and photoconductive. Layer 132 may either consist of a mixture of a thermoplastic and a photoconductor such as a one to one mixture by weight of polystyrene and zinc cadmium sulfide or layer 132 may consist of an organic compound which is both thermoplastic and photoconductive. Such organic compounds as vinyl carbazole, or phthalocyanine, or chloroanil have the required thermoplastic and photoconductive properties.

The operation of the second embodiment is identical to the operation of the first embodiment. Writing is accomplished by depositing a pattern of electric charges on the surface of layer 132 when layer 132 is in the nonconductive state due to the absence of any illumination from source 16. After the charge pattern is deposited, layer 132 is heated and thereby deformed due to the electrostatic forces. Reading is accomplished by directing an electron beam at layer 132 and detecting the number of backscattered electrons.

Several variations are possible in the mode of operation thus far described with respect to the first and second embodiments. For example, instead of depositing a pattern of charges on layers 31 or 132 during the writing operation using a relatively low energy beam, one could first charge up the entire surface of layers 31 or 132 using a low energy beam and then one could selectively discharge discrete areas using a high energy beam. This mode of operation has the advantage that it is easier to focus a high energy electron beam. The result is a pattern having discrete areas where there are charges and other areas where there are no charges. The thermoplastic material is deformed after heating in the same manner as previously described.

Another variation which is possible is the elimination of light source 16 by the use of electron bombardment induced conductivity. As previously described, layers 31 and 132 are made conductive for the read operation by illuminating them with light source 16. It is essential that layer 31 or 132 be made conductive during the reading operation in order to prevent the accumulation of charge. The accumulation of charge can be prevented by merely using a very high velocity electron beam during the reading operation. If a high velocity electron beam is used, the area whereon the beam is incident becomes conductive due to electron bombardment induced conductivity even though the area is not illuminated by light source 16. If an electron beam having sufficient velocity to induce conductivity due to electron bombardment is used for the reading operation, light source 16 can be eliminated. For this mode of operation, the electron beam used for reading should have sufficient energy to induce conductivity, but it should not have an excessively large amount of energy because if it does have an excessively large amount of energy the amount of backscattering will be somewhat independent of topology. The optimum energy can be easily determined by trial and error.

The term thermoplastic as used herein refers to any material which becomes pliable due to the application of heat and which can be repeatedly cycled through the solid and pliable states.

The term backscattered electrons as used herein refers to secondarily emitted electrons and/or electrons which are actually backscattered from the incident beam. Stated differently, the term backscattered electrons refers to all electrons which leave the surface of area 14 irrespective of their energy. Naturally, detector 18 only responds to electrons in a certain energy band.

A greater output signal is obtained by having a detector which responds to both secondarily emitted electrons and those which are actually backscattered from the incident beam. However, if in order to obtain a very high resolution a very high energy beam is used for reading, then the band of energies between the secondarily emitted electrons and the electrons which are actually backscattered from the incident beam will be larger than the range of available detectors. In this case, either a plurality of detectors having different ranges could be used or the system could use one detector in a particular range, preferably in the range of the secondarily emitted electrons. The secondarily emitted electrons alone do contain the necessary information.

While the invention has been particularly shown and described with reference to a preferred embodiment thereof, it will be understood by those skilled in the art that various changes in the form and details may be made herein without departing from the spirit and scope of the invention.

What is claimed is:

1. An information storage system wherein information is stored in the form of a deformation pattern comprising:
   an electrically conductive member;
   a thermoplastic layer disposed on said conductive member;

a thin coating of photoconductive material disposed on said thermoplastic layer;

means for depositing an electrostatic charge pattern on said thin coating while said photoconductive material is in the high resistivity state;

heating means for heating said thermoplastic material to deform said thermoplastic material and said thin coating in accordance with the electrostatic charge pattern deposited on said thin coating, and an electrical connection to said photoconductive material for draining charge therefrom when said material is in the conductive state; and readout means including means for illuminating said photoconductive material, means for directing an electron beam at said thin coating, and means for detecting the number of backscattered electrons, thereby detecting the deformation pattern of said thin coating.

2. An information storage system wherein information is stored in the form of a deformation pattern comprising:

an electrically conductive member;

a thermoplastic layer disposed on said conductive member;

a thin coating of material with a variable resistivity disposed on said thermoplastic layer, said coating having a high resistance state and low resistance state;

means for depositing an electrostatic charge pattern on said thin coating while said coating is in the high resistance state;

heating means for heating said thermoplastic material to deform said thermoplastic material and said thin coating in accordance with the electrostatic charge pattern deposited on said thin coating;

an electrical connection to said thin coating of variable resistivity material for draining charge therefrom when said coating is in the low resistance state; and readout means including means for reducing the resistance of said thin coating, means for directing an electron beam at said thin coating, and means for detecting the number of backscattered electrons, thereby detecting the deformation pattern of said thin coating and of said thermoplastic material.

3. An information storage system wherein information is stored in the form of a deformation pattern comprising:

an electrically conductive member;

a thermoplastic layer disposed on said conductive member;

a thin coating of photoconductive material disposed on said thermoplastic layer;

means for depositing an electrostatic charge pattern on said thin coating while said photoconductive material is in the high resistivity state;

means for passing current through said electrically conductive member thereby heating said thermoplastic material and deforming said thermoplastic material and said thin coating in accordance with the electrostatic charge pattern deposited on said thin coating;

an electrical connection to said photoconductive material for draning charge therefrom when said material is in the conductive state; and readout means including means for reducing the resistance of said photoconductive material, means for directing an electron beam at said thin coating, and means for detecting the number of backscattered electrons, thereby detecting the deformation pattern of said thin coating and of said thermoplastic material.

4. An information storage system wherein information is stored in the form of a deformation pattern comprising:

an electrically conductive member;

a thermoplastic layer disposed on said insulating member;

a thin coating of material with a variable resistivity disposed on said thermoplastic layer, said coating having a high resistance state and a low resistance state;

means for depositing an electrostatic charge pattern on said thin coating while said coating is in the high resistance state;

means for heating said thermoplastic material to deform said thermoplastic material in accordance with the electrostatic charge pattern deposited on said thin coating;

an electrical connection to said thin coating of variable resistivity material for draining charge therefrom when said coating is in the low resistance state; and readout means including means for reducing the resistance of said thin coating, means for directing an electron beam at said thin coating, and means for detecting the number of backscattered electrons, thereby detecting the deformation pattern of said thin coating and of said thermoplastic material.

5. An information storage system wherein information is stored in the form of a deformation pattern comprising:

a layer of conductive material;

a thermoplastic layer disposed on said layer of conductive material;

a thin coating of material having variable resistivity disposed on said thermoplastic layer, said coating having a high resistance state and a low resistance state;

means for depositing an electrostatic charge pattern on said thin coating while said thin coating is in the high resistance state;

heating means for heating said thermoplastic layer and said thin coating whereby said thin coating and said thermoplastic layer deform in accordance with the electrostatic charge pattern on said thin coating, and an electrical connection to said thin coating of variable resistivity material for draining charge therefrom when said coating is in the low resistance state;

readout means including means for reducing the resistance of said thin coating and means for directing a first electron beam at said thin coating;

means for controlling the position of said first electron beam on said thin coating;

detecting means for generating a signal indicative of the number of electrons backscattered from said thin coating;

a cathode ray scope having an electron beam;

means for moving the electron beam in said cathode ray scope in synchronization with said first electron beam; and means for modulating the electron beam in said cathode ray scope in accordance with the signal generated by said detecting means;

whereby an image is generated on the face of said cathode ray scope which indicates the deformation of said thin coating and thereby indicates the stored information.

6. The system recited in claim 5 wherein said thin coating consists of photoconductive material, and said means for reducing the resistance of said thin coating comprises means for directing light at said layer.

7. The device recited in claim 5 wherein said heating means comprises means for passing current through said layer of conductive material.

8. An information storage system wherein information is stored in the form of a deformation pattern comprising:

a member having thermoplastic and variable resistance properties;

an electrically conductive layer beneath said member;

means for depositing an electrostatic charge pattern on the top of said member while said member is in a high resistance state;

heating means for heating said member to deform said member in accordance with said electrostatic charge pattern, and an electrical connection to said member for draining charge therefrom when said member is in the low resistance state;

readout means including means for reducing the resistance of said member, means for directing an electron beam at said member, and means for detecting the number of backscattered electrons, thereby detecting the deformation pattern of said member.

9. An information storage system wherein information is stored in the form of a deformation pattern comprising:

a member having thermoplastic and variable resistance properties;

an electrically conductive layer beneath said member;

means for depositing an electrostatic charge pattern on the top of said member while said member is in a high resistance state;

heating means for heating said member to deform said member in accordance with said electrostatic charge pattern, and an electrical connection to said member for draining charge therefrom when said member is in the low resistance state;

readout means including means for deflecting high energy electrons from the surface of said member, said electrons having sufficient energy to induce conductivity in said member and thereby prevent the accumulation of charge, and means for detecting the number of backscattered electrons, thereby detecting the deformation pattern of said member.

10. An information storage system wherein information is stored in the form of a deformation pattern comprising:

a member having thermoplastic and photoconductive properties:

an electrically conductive layer beneath said member;

means for depositing an electrostatic charge pattern on the top of said member while said member is in a high resistance state;

heating means for heating said member to deform said member in accordance with said electrostatic charge pattern, and an electrical connection to said member for draining charge therefrom when said member is in the low resistance state;

readout means including means for illuminating said member to reduce the resistance thereof, means for directing an electron beam at said member, and means for detecting the number of backscattered electrons, thereby detecting the deformation pattern of said member.

References Cited by the Examiner

UNITED STATES PATENTS

| | | | |
|---|---|---|---|
| 3,000,735 | 9/1961 | Gunning et al. | 340—173 |
| 3,077,150 | 2/1963 | Schaffert | 250—213 X |
| 3,247,493 | 4/1966 | Wolfe et al. | 340—173 |

References Cited by the Applicant

UNITED STATES PATENTS 2,985,866 Norton.
3,055,006 Dreyfoos et al.

BERNARD KONICK, *Primary Examiner.*

J. BREIMAYER, *Assistant Examiner.*